(12) United States Patent
Gerlich et al.

(10) Patent No.: US 6,299,783 B1
(45) Date of Patent: Oct. 9, 2001

(54) PROCESS FOR CLEANING UP WASTEWATERS FROM THE HOCK PROCESS

(75) Inventors: Otto Gerlich, Gladbeck; Werner Pompetzki, Dorsten; Dietmar Ahrens, Aschendorf, all of (DE)

(73) Assignee: Phenolchemie GmbH & Co. KG, Gladbeck (DE)

( * ) Notice: Subject to any disclaimer, the term of this patent is extended or adjusted under 35 U.S.C. 154(b) by 0 days.

(21) Appl. No.: 09/376,990

(22) Filed: Aug. 19, 1999

(30) Foreign Application Priority Data

Aug. 20, 1998 (DE) ................................. 198 37 723

(51) Int. Cl.$^7$ ....................................... C02F 1/72
(52) U.S. Cl. .................... 210/758; 210/761; 210/909; 210/919
(58) Field of Search .................... 210/758, 761, 210/909, 919

(56) References Cited

U.S. PATENT DOCUMENTS

| 3,963,610 | 6/1976 | Hauschulz et al. . |
|---|---|---|
| 4,000,068 | 12/1976 | Nelson et al. . |
| 4,026,791 | * 5/1977 | Wallace . |
| 4,145,283 | 3/1979 | Topp et al. . |
| 4,767,543 | * 8/1988 | Chornet et al. . |
| 4,853,136 | 8/1989 | Roussel et al. . |

FOREIGN PATENT DOCUMENTS

| 0 431 932 | 6/1991 | (EP) . |
|---|---|---|
| 1 459 458 | 12/1976 | (GB) . |

* cited by examiner

Primary Examiner—Betsey Morrison Hoey
(74) Attorney, Agent, or Firm—Oblon, Spivak, McClelland, Maier & Neustadt, P.C.

(57) ABSTRACT

A process for reducing the loading of wastewaters produced in the preparation of hydroxyl and carbonyl compounds from hydroperoxides by the Hock process, which may be acidic, by treating the wastewaters with an oxygen-containing gas at a pressure greater than 25 bar absolute and at a temperature of 150–250° C. Surprisingly, improved degradation rates are achieved under these conditions.

14 Claims, No Drawings

PROCESS FOR CLEANING UP WASTEWATERS FROM THE HOCK PROCESS

BACKGROUND OF THE INVENTION

1. Field of the Invention

The present invention relates to a process for cleaning up wastewaters by wet oxidation, where the wastewaters are produced in the preparation of hydroxyl and carbonyl compounds by the Hock process. In particular, the invention relates to a process for cleaning up wastewaters by wet oxidation, which wastewaters are produced in the preparation of phenol and acetone by the Hock process.

2. Description of The Background

The simultaneous preparation of phenol and acetone by the Hock process is based on the oxidation of cumene to cumene hydroperoxide and the subsequent acid-catalyzed cleavage of the cumene hydroperoxide to form phenol and acetone. The catalyst in this reaction is preferably sulfuric acid. Depending on the process procedure, the production of phenol and acetone is accompanied by formation of a varying amount of byproduct. The different wastewater streams which are generally produced in the process, in particular due to various washing processes in the course of the workup of the cleavage product, are therefore generally contaminated with various organic and/or inorganic substances at varying concentrations. The same generally also applies to wastewaters from other Hock processes. These sometimes acidic, sometimes basic, wastewaters, generally require, either together or separately, a pretreatment to reduce the wastewater loading prior to introduction into a biological effluent treatment plant, in order not to overload the biological purification stage and to decrease the content of poorly biodegradable constituents. In particular, phenol-containing wastewaters, because of the toxicity of phenol, cannot be discharged into open bodies of water.

To clean up phenol-containing wastewaters from the Hock process, extractive processes using, e.g. cumene or acetophenone as extraction medium (e.g. DE 1 075 119 and DE 22 35 493), steam distillation processes and adsorption to surface-active substances, such as activated carbon or synthetic resin ion exchangers are known (cf. Ullmann's Encyclopedia G' Industrial Chemistry, 5th edition, Vol. A19, p. 308, VCH Verlagsgesellschaft, Weinheim, 1991). A residual phenol content is obtained which can be removed in a biological effluent treatment plant.

However, recently, still lower wastewater loadings than are achievable using these processes alone, which processes are orientated toward phenol, are increasingly being sought after. A wastewater loading as low as possible with respect to the entire spectrum of possible constituents is desired not least for environmental reasons. In addition, government regulations may impose increased costs for the treatment of wastewaters with high loading, which also stimulates the need for process which reduce wastewater loadings.

A generally known process of chemical wastewater treatment for improving the biodegradability of wastewater constituents and for reducing the wastewater loading is wet oxidation. Wet oxidation is a process in which, at elevated temperature and an elevated pressure to maintain the liquid phase, wastewater streams whose constituents are degraded too slowly in the course of the biological wastewater purification, or which can adversely affect this degradation, are worked up. The oxidizing agents used are preferably air or oxygen. In the ideal case, hydrocarbons for example, in the wet oxidation produce solely carbon dioxide and water.

A gross differentiation is made between low-pressure (120° C., 6 bar) and high-pressure processes (320° C., 200 bar) (Römpp-Chemie-Lexikon [Römpp's Chemistry Lexicon], 9th edition, 1991). Although there is a general trend for higher temperatures to cause higher degradation rates in wet oxidation, the degradation rates achievable are always specific to a substance (see, for example, B. Perkow, Steiner. Vollmüller: Naßoxidation-Ein Beitrag zum Stand der Technik [Wet oxidation], Chem.-Ing.-Tech. 52 (1980), No. 12, p. 943 ff.). Therefore, various wet oxidation processes have been developed for specific applications, such as for wastewaters from the cyclic condensation of acetone (DE 44 28 413 A1) or for cyanide-containing wastewaters (e.g. DE 44 10 04 A1). The use of catalysts in wet oxidation to decrease the temperature required is also disclosed (e.g. DE 196 05 421 A1).

JP 1-310794 discloses a wet oxidation process preferably suitable for cleaning up wastewaters from the Hock process: the wastewaters containing organic substances are adjusted to a pH of from 1–3, preferably with sulfuric acid, nitric acid or hydrochloric acid, and then treated with an oxygen-containing gas at high temperatures and pressures in the liquid phase without a catalyst. Preferably, the treatment is carried out at from 175–200° C. and apparently superatmospheric pressures between approximately 3 and 6 bar, based on the vapor pressure, i.e. at pressures between approximately 12 and 22 bar absolute, for from 2–6 hours. The oxygen-containing gas can be pure oxygen or air for example.

However, the need remains for improved processes which overcome the disadvantages described above.

SUMMARY OF THE INVENTION

It is an object of the present invention to provide an improved process for the wet oxidation of wastewaters which are produced in the preparation cf hydroxyl and carbonyl compounds from hydroperoxides via the Hock process.

It is another object of the invention to provide a process for reducing wastewater loading which may be practiced in a very simple manner on an industrial scale.

It is a particular object of the present invention to provide a process for reducing the loading of wastewaters that are by-products from the preparation of phenol and acetone by the Hock process.

The objects of the invention, and others, may be achieved with a process for cleaning up acidic or acidified wastewaters, which are produced in the preparation of hydroxyl and carbonyl compounds from hydroperoxides by the Hock process, by wet oxidation in the liquid phase using oxygen-containing gas, which comprises treating the wastewaters at pressures greater than 25 bar absolute and temperatures of from 150–250° C.

Various other objects, features and attendant advantages of the present invention will be more fully appreciated as the same becomes better understood from the following detailed description.

DETAILED DESCRIPTION OF THE INVENTION

Surprisingly, it has been found that, in comparison with the process described in JP 1-310794, simply by a moderate elevation of the pressure in the wet oxidation, a marked increase in the degradation rate, and thus reduction of the wastewater loading, can be achieved in the wastewaters treated according to the present invention. This is all the more surprising, since, usually, in particular a higher temperature, effects higher degradation rates and the pressure is only adjusted to maintain the liquid phase. In contrast to JP 1-310794, with the inventive process, acidification of the wastewaters to a pH of from 1–3 is not necessary for the wet oxidation. In fact, this pH range may even be undesirable, since the low pH makes the further wastewater treatment, i.e. downstream treatment, more complex. The moderate preferred reaction pressure between 30 and 50 bar absolute is, in contrast, very readily achievable technically and further requires, in contrast to the high-pressure wet oxidation, no corresponding high-pressure equipment.

The wastewaters to be treated according to the invention preferably originate from the Hock process for preparing phenol and acetone from cumene. Relatively large wastewater streams may be produced in this process, for example in the neutralization of the acidic cleavage product from the cumene hydroperoxide cleavage, which is generally catalyzed by sulfuric acid, usually with phenolate or alkali liquor and subsequent phase separation (cleavage product washing) or in the treatment of water from the decomposition of the phenolate liquor which originates from the cumene washing. On account of the byproduct formation during the process, the sometimes acidic, sometimes basic wastewaters, depending on origin, can contain, to a varying extent, in addition to phenol and acetone, various organic and/or inorganic substances, such as acetic acid, formic acid, condensed phenols and the like. They typically have TOC values (TOC: total organic carbon) of from 5,000–10,000 mg/l, a chemical oxygen demand (COD) of from 10,000–22,000 mg/l and a biological oxygen demand ($BOD_5$) of from 5,000–11,000 mg/l. However, the wastewaters to be treated according to the invention may also originate from Hock processes for preparing, for example, cyclodecanone, hydroquinone, and the like.

The pressure in the inventive process is at least 25 bar absolute and the temperature may be 150–250° C. Preferably, the pressure is from 30–50 bar absolute and the temperature from 175–250° C. These pressure ranges include all specific values and subranges therebetween, such as 160, 175, 200 and 250° C. These temperature ranges include all specific values and subranges therebetween, such as 35, 40 and 45 bar absolute.

The wastewaters, prior to the treatment by wet oxidation according to the invention, can be wholly or partially combined or else fed separately to the wet oxidation according to the invention. Alkaline wastewaters which may arise are, prior to the wet oxidation, combined according to the invention with other acidic process wastewaters or adjusted with acid, preferably sulfuric acid, in such a manner that they have a pH in the acidic range below 7. Accordingly, as used herein the term "acidic" refers to a pH value below 7.

It can be preferable to subject the wastewaters, prior to the treatment with the process according to the invention, initially to a process for reducing the phenol content, e.g. an extraction using cumene. Since the wastewaters are made acidic for phenol extraction anyway, a subsequent treatment according to the invention for the further reduction of the wastewater loading is especially useful here. It can also be advantageous to subject the wastewaters to be treated, prior to the wet oxidation according to the invention, additionally or solely to stripping to decrease the content of low boilers.

Preferably, the wastewaters, prior to the treatment according to the invention, are pretreated and/or combined in such a manner that they have an acidic pH greater than 3, particularly preferably between 3 and 5, and phenol contents of up to about 500 ppm.

The wet oxidation itself according to the invention is carried out in the specified temperature and pressure range usually and preferably in conventional bubble column reactors.

To improve the corrosion properties, it is advantageous to use an apparatus lined, for example, with tantalum or titanium/titanium dioxide.

The oxygen-containing gas used is preferably air, pure oxygen or a mixture of both gases.

Preferably, about from 100–150% of the stoichiometrically required amount of oxygen is fed to the wastewater with the oxygen-containing gas. The residence time in the reactor is from 2–8 hours, preferably from 4–6 hours.

As the Examples below demonstrate, using the process according to the invention, in particular for acidic or acidified wastewaters from the Hock process for preparing phenol and acetone from cumene, significantly higher TOC and COD degradation rates can be achieved than with known processes in a very simple manner. The inventive process is applicable to wastewaters from other Hock processes. As a result, the wastewater loading and the pollution figure of the treated wastewater is considerably decreased. If levies are to be paid according to the pollution figure of the wastewater on introduction into a biological effluent treatment plant, these charges are correspondingly reduced. The process according to the invention is thus attractive for environmental protection reasons and also economic reasons.

For further improvement of the degradation rates, it can be advantageous to use, in addition, catalysts such as $Fe^{++}$ salts in combination with quinoid compounds, such as hydroquinone or anthraquinone, in the wet oxidation according to the invention. However, the use of a catalyst is not generally preferred, since it is associated with the necessity for separating off the catalyst from the wastewater prior to introduction into an effluent treatment plant, which greatly increases the complexity of the process, depending on the catalyst.

The omission, which is preferred according to the invention, of a decrease in the pH to a value of from 1–3 in the wastewater to be treated, as is described by JP 1-310794, further leads in these wastewaters to a reduction in the alkali requirement for neutralizing the wastewaters prior to discharge to a biological effluent treatment plant. This, of course, reduces the salt content of these wastewaters. A further advantage of the higher pH is the reduced material corrosion caused by the wastewaters, which is reflected in lower apparatus costs and maintenance costs for the process.

In one embodiment, the process of the present invention provides at least a 30% reduction in the TOC of the wastewater. Preferably, the reduction in the TOC is at least 40%, more preferably at least 60%, and, most preferably, at least 75%.

Having generally described this invention, a further understanding can be obtained by reference to certain specific examples which are provided herein for purposes of illustration only and are not intended to be limiting unless otherwise specified.

EXAMPLES

Comparative Example 1

660 ml of a wastewater, which originates from the cleavage product washers of a phenol plant downstream of Hock process and has a TOC value of 3927 mg/l, a COD value of 9697 mg/l, a $BOD_5$ value of 5500 mg/l and a pH of 2.95 are charged into a stirred autoclave made of tantalum having a total capacity of 1 l. The remaining gas space is flushed three times with oxygen in order to produce a pure oxygen atmosphere in the gas space. The autoclave is heated to a reaction temperature of 175° C. in the course of approximately 60–90 minutes. The reaction pressure of 13 bar absolute is established after reaching the reaction temperature. Wastewater samples of 20 ml are withdrawn via a sampling port as a function of time, in order to be able to examine the time course of the change in TOC and COD value. After the experiment is terminated after 6 hours, the $BOD_5$ value of the treated wastewater is determined. The values determined are shown in Table 1.

The reaction conditions in this Example, therefore, correspond to the specifications of JP 1-31094.

Example 2

Likewise, 660 ml from the same wastewater stream initially having a TOC value of 3748 mg/l, a COD value of 9697, a $BOD_5$ value of 5500 mg/l and a pH of 3.2 are treated at a reaction pressure of 50 bar absolute and a reaction temperature of 175° C. in a manner otherwise identical to that in Comparative Example 1. Compared with Comparison Example 1, the reaction conditions therefore deviate primarily in reaction pressure. The TOC, COD and BOD values determined are likewise shown in Table 1.

A comparison of the values determined with Comparative Example 1 shows that using the treatment according to the invention at a higher pressure but the same temperature, a marked improvement in degradation rates by up to 20 percentage points is achieved.

Examples 3–7

In Examples 3–7,660 ml of the wastewater stream, from the cleavage product washing, mentioned in Comparative Example 1 are likewise used. The initial values of TOC, COD, $BOD_5$ and pH are shown in Table 1. The pH was adjusted here in the context of these Examples by adding sodium hydroxide solution. The experimental procedure was carried out at the pressures and temperatures specified in each case in Table 1 in a similar manner to Comparative Example 1. The final determination of the $BOD_5$ value was omitted.

The TOC and COD values of the wastewaters determined in each case during and after the treatment according to the invention are again shown in Table 1. The results clearly verify the improved degradation of the wastewater loading by the process according to the invention.

Obviously, numerous modifications and variations of the present invention are possible in light of the above teachings. It is therefore to be understood that within the scope of the appended claims, the invention may be practiced otherwise than as specifically described herein.

This application is based on German Patent Application No. 19837723.1, filed on Aug. 20, 1998, and incorporated herein by reference.

What is claimed as new and is intended to be secured by letters patent is:

1. A process for reducing the loading of a wastewater produced in the preparation of hydroxyl and carbonyl compounds from hydroperoxides by the Hock process, comprising:

treating the wastewater with an oxygen-containing gas at a pressure greater than 25 bar absolute and at a temperature of 150–250° C., wherein the wastewater is treated in the liquid phase, and wherein the wastewater has an acidic pH.

2. The process of claim 1, wherein the wastewater is acidified prior to treatment with the oxygen-containing gas.

3. The process of claim 2, wherein the pH of the wastewater to be treated is between 3 and 5.

4. The process of claim 1, wherein the wastewater is the by-product of the Hock process for preparing phenol and acetone from cumene hydroperoxide.

5. The process of claim 1, wherein the wastewater is treated at a pressure of 30–50 bar absolute.

6. The process of claim 1, wherein the wastewater is treated at a temperature of 175–250° C.

7. The process of claim 1, wherein the pH of the wastewater to be treated is greater than 3.

8. The process of claim 1, wherein the treatment is conducted with 100–150% of the stoichiometrically required amount of oxygen for reacting with all organic contaminants in the wastewater.

9. The process of claim 1, further comprising, prior to the treatment with the oxygen-containing gas, removing phenol from the wastewater.

10. The process of claim 1, wherein at least two different wastewater streams are treated separately with the oxygen-containing gas.

11. The process of claim 1, wherein at least two different wastewater streams from the Hock process are combined prior to the treatment with the oxygen-containing gas.

12. The process of claim 11, wherein the combined wastewater has an acidic pH.

13. The process of claim 1, further comprising, prior to the treatment with the oxygen-containing gas, adjusting the pH of the wastewater to an acidic pH with sulfuric acid.

14. The process of claim 1, wherein the oxygen-containing gas is air, pure oxygen, or a mixture thereof.

| Ex. | $O_2$ pressure [bar] | Temp. [° C.] | pH starting material | pH after oxidation 6 h | Initial COD [mg/l] | Initial $BOD_2$ [mg/l] | Initial TOC [mg/l] | TOC [mg/l] 2 h | Degradation [%] 2 h | TOC [mg/l] 4 h | Degradation [%] 4 h | TOC [mg/l] 6 h |
|---|---|---|---|---|---|---|---|---|---|---|---|---|
| 1 | 13 | 175 | 2.95 | 3.2 | 9697 | 5500 | 3927 | 2886 | 26.5 | 2454 | 37.5 | 2107 |
| 2 | 50 | 175 | 3.2 | 4.2 | 9697 | 5500 | 3748 | 2141 | 42.9 | 1710 | 54.4 | 1458 |
| 3 | 30 | 175 | 3.2 | 3.9 | 9697 | 5500 | 3938 | 2328 | 40.9 | 1975 | 49.8 | 1664 |
| 4 | 50 | 250 | 3.2 | 4.2 | 9697 | 5500 | 3925 | 1504 | 61.7 | 1365 | 65.2 | 1290 |
| 5 | 50 | 250 | 3.2 | 4.4 | 9697 | 5500 | 3980 | 1670 | 58.0 | — | — | — |
| 6 | 30 | 175 | 3.8 | 5.1 | 9697 | 5500 | 3980 | 2551 | 35.9 | 1988 | 50.1 | 1730 |
| 7 | 30 | 175 | 4.3 | 5.5 | 9697 | 5500 | 3980 | 2780 | 30.2 | 2184 | 45.1 | 1989 |

\* \* \* \* \*